United States Patent [19]
Bell et al.

[11] Patent Number: 4,928,939
[45] Date of Patent: May 29, 1990

[54] LOCATOR AND CLAMPING MEANS FOR A JIG FIXTURE

[76] Inventors: Michael G. Bell, 9435 Flower St., #125, Bellflower, Calif. 90706; Robert L. Stevens, 4605 Silver Tip Dr., Whittier, Calif. 90601

[21] Appl. No.: 389,167

[22] Filed: Aug. 3, 1989

[51] Int. Cl.$^5$ .............................................. B23Q 1/08
[52] U.S. Cl. .................................... 269/309; 269/900
[58] Field of Search .............. 409/219, 220, 225, 218; 29/563, 564, 566, 559; 269/47, 309–310, 900, 303, 315, 69, 99, 100, 91, 101

[56] References Cited

U.S. PATENT DOCUMENTS

| | | | |
|---|---|---|---|
| 4,191,366 | 3/1980 | Robin | 269/900 |
| 4,444,541 | 4/1984 | Bergman | 269/309 |
| 4,794,687 | 1/1989 | Peters et al. | 269/900 |

*Primary Examiner*—Robert C. Watson
*Attorney, Agent, or Firm*—Dominick Nardelli

[57] ABSTRACT

A locator and clamping means, for accurately locating and securing a workpiece onto the flat workplate or bed of a machining tool wherein the bed is of the type having a plurality of spaced grooves with one set disposed at right angles to another set, consists of jig into which the workpiece is secured and which has a flat surface wherein three accurately positioned non-aligned holes are located and consists of dowels removably secured within said respective holes and protruding therefrom. In addition, three apertured keys are slidably disposed within the grooves in the bed so that each key is capable of receiving one dowel. To facilate the insertion of each dowels into a respective aperture, the dowels are tapered and each aperture in the respective key is congruent to the taper. Then, when the three dowels engage the three keys, the jig and, in turn, the workpiece is acturately positioned on and secured to the bed.

5 Claims, 1 Drawing Sheet

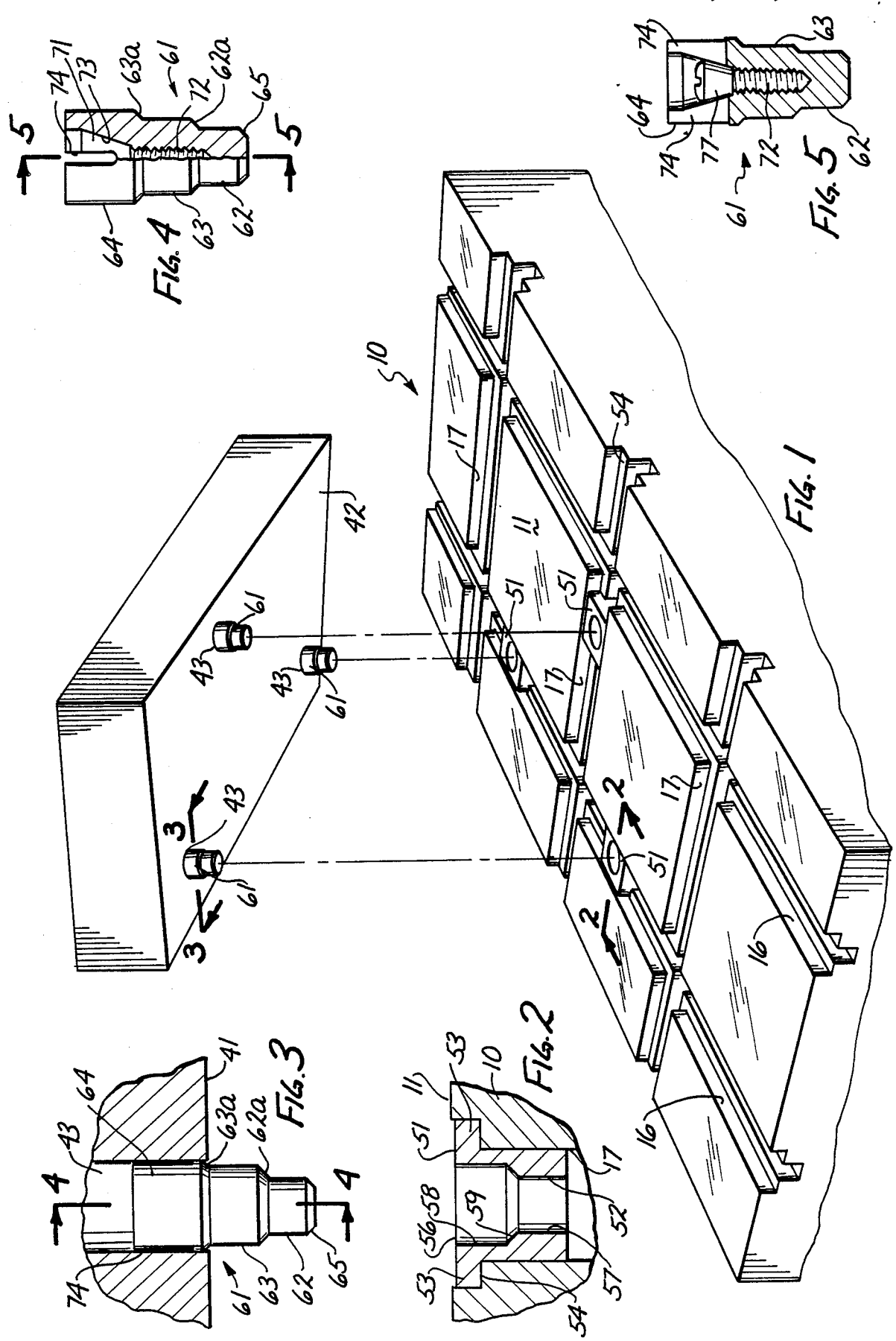

1

LOCATOR AND CLAMPING MEANS FOR A JIG FIXTURE

BACKGROUND OF THE INVENTION

1. Field of the Invention:

This invention relates to a means for accurately locating and clamping a jig fixture onto the bed or platen of, for example, a milling machine and, more particularly, to a means that is simple, positive, durable and rugged for use with relatively large and heavy jigs of various sizes and shapes.

2. Description of the Prior Art:

Machine tools such as milling machines typically include a work bed on which the workpiece is held while it is being milled. In order for the machining operation to be carried out accurately, it is necessary for the workpiece to be positioned precisely on the work bed relative to the cutting tool. In the past, various types of jigs and other fixtures have been used to provide stop surfaces against which the workpiece can be held to locate it in the proper location.

However the problem is more complicated whenever the workpiece is relatively large, heavy and clumbersome and the workpiece must be transferred from one type of cutting machine to another type and sometimes back to the first machine. To help solve this problem the workpiece would be clamped within a specially designed jig or fixture. Since the beds onto which the jigs are to be positioned are planar the jig is design with a complementary flat or planar surface. In addition, such beds have recessed therein a plurality of criss-cross straight grooves. Accurately positioned, cylindrical and perpendicular holes are formed in the flat surface of the jig, in which holes are fixed dowels or fixture keys extending out from the surface. To set up the workpiece for maching, the jig is supported over the cutting tool bed and carefully lowered onto the bed. By sight one has to make sure that each key is carefully aligned with a respective groove. The jig is locked in place when engagement is made between the dowels and grooves.

The disadvantage in this method is that, if the respective key is not fully aligned with its respective groove, damage is done to the dowels and to the tool bed because the weight of the jig would now be concentrated on a relatively small area. Damaged dowels or keys are cheaply replaced but a damaged tool bed requires expensive repair work.

The following United States Patent were uncovered: U.S. Pat. Nos. 744,559; 2,472,083; 2,676,413; 2,707,419; 3,049,345; 3,063,705; 3,554,530; 3,942,780; 3,967,816; 4,577,847 & 4,664,366. Although they teach means for "holding down" a work piece for machining, they do not suggest that the means described herein could or should be used.

SUMMARY OF THE INVENTION

1. Statement:

The present invention teaches that each dowel placed in the jig has a circular shape depending or extending from the jig surface. Then three apertured keys are slidable placed in the criss-cross grooves in the bed wherein one key is placed in a groove that crosses both grooves wherein the other two keys are located. Then when one lowers the jig onto the bed one can slide the respective key into alignment with the dowel. As an inprovement we have found that by tapering the hole in the key and tapering the exposed surface of the dowel, that the system becomes practically self-aligned.

2. Objects:

An object of this invention is to provide at least three apertured keys slideable disposed in grooves of a tool bed and circular shaped dowels each of which is capable of engaging one of the apertured key.

Another object of this invention is to provide a conical aperature within each of the keys of the previous object and to provide tapered dowels depending from the jig.

BRIEF DESCRIPTION OF THE DRAWING

FIG. 1 is a pictorial representation of a typical work bed for a machine tool and is shown wherein the rest of the machine tool is broken away for clarity. In addition, the underside of a typical jig is shown spaced above the upper surface of the work bed.

FIG. 2 is a fragamentary section taken on line 2—2 in FIG. 1 in the direction of the arrows showing our novel keys in crosssection and positioned within the grooves of the bed.

FIG. 3 is another fragamentary section taken on line 3—3 in FIG. 1 also in the direction of the arrows showing the exterior of our novel dowels.

FIG. 4 is a half-section of one of our dowels taken on line 4—4 in FIG. 3 in the direction of the arrows showing the internal features thereof.

FIG. 5 is full section of the dowel in FIG. 4 taken on line 5—5 in the direction of the arrows but this view shows a screw disposed therein to secure the dowel to the jig.

DETAILED DESCRIPTION OF THE DRAWING

Referring to the drawing and to FIG. 1, in particular, the numeral 10 generally designates a typical work bed for a machine tool of the type previously mentioned. For clarity only the work bed 10 is shown and one understands that this bed 10 is suitably supported to move in the up and down direction, in the back and forth direction and in the side to side direction. The support for allowing this type of movement is well known in the art and therefore is not shown. The bed 10 has an upper flat or planar surface 11 wherein are formed a plurality of criss-cross, T-shaped grooves. For clarity the longitudinal grooves are item 16 and the transversal grooves are item 17. A typical work bed would have more longitudinal grooves 16 and also more transversal grooves 17 than shown herein, but the number shown are sufficient to teach our invention. Also as shown in FIG. 1 each groove 16 & 17 has a T-shape cross-section which is identical to the cross-section of every other groove. The description of the bed up to now is well known in the art.

There is also schematically shown in FIG. 1, a prior art jig 41 that has a flat or planar surface 42 with three openings or holes 43 accurately positioned therein. As mentioned before the prior art, i.e., U.S. Pat. No. 2,707,419, teaches to place "fixture keys having circular shanks secured within said openings 43 and heads of various polygonal shapes centrally disposed relatively to the shanks and depending from the fixture plate" jig. The head is adopted for movement within a respective groove 16 & 17 in the work bed.

Our invention consists of providing a plurality of keys 51 (one of which is shown in cross-section in FIG. 2). FIG. 1 shows transverse groove 17. However, one can place two keys in two different longitudinal grooves or replace the transverse grooves with the longitudinal ones without departing from the spirit of our invention. Each key has a bore 52 symetrical about an axis and preferably shaped wherein the bore has a larger diameter at its end adjacent the surface 11 than the diameter at its remote end. As shown in FIG. 2, the key 51 has shoulders 53 disposed on opposite sides and they rest on a ledge 54 within the T-shape groove 17. The thickness of the shoulders is such that a surface 56 of the key 51 is co-planar with surface 11 or slightly imbedded within the groove. We have found that by making the bore 52 by boring a cylindrical hole 57 of a given diameter thorough the key 51 and then countersinking a bore 58 with a larger diameter into surface 56, a beveled middle surface 59 can be readily produced and, in turn, the key 51 is economically and easily produced. One understands, as will more clearly be pointed out, that the clearance between the opposing upper sides of the groove 17 and the edge of the shoulders on the key 51 should be very close so that the jig 41 when properly placed will not move laterally or parallel to the surface 11 but still one can be able to slide the key 51 along the groove. In addition, one skill in the art can readily see that the features of our invention would also produce an advantage if the criss-crossing grooves are located within the flat surface of the jig and, in turn, the three accurately positioned holes are located withing the bed of the machine tool.

The other part of our invention consists of dowels 61 each disposed within one of the respective holes 43 in the jig 41. Our dowels are limited to the shape wherein each is symetrical about an axis This makes for simpler alignment between the dowels and the keys. In this prefered embodiment each dowel is shaped to have three diameters 62, 63 and 64, each greater than the adjacent one. The largest diameter 64 fits snugly, within hole 43 and is secured therein by means to be described. Each diameter is joined to its adjacent one by a beveled or conical section such as section 62a between diameters 63 and 63 and section 63a between diameters 63 and 64. The exposed end of diameter 63 has a conical section 65. Naturally one understands that the clearance between diameter 63 and bore 58 in key 51 is relatively close. To ensure that dowel 61 is fixed within hole 43 and also is capable of being readily inserted and removed, the dowel 61 is provided with means that firmly fixes the dowel within the hole. Refering to FIGS. 4 & 5, the prefered means for doing the securing is shown. The dowel has formed therein and axial well 71 (a close-ended bore). Near the closed end or conical section 65 the well 71 is provided with female screw threads 72. The open end thereof is provided with a conical shaped hole 73 while the diameter 64 thereof is provided with a pair of axially aligned, opposing slots 74 as shown. A machine screw 76 is threaded into threads 72 and has a head 77 shaped into a conical section that matches the conical hole 73. One can readily understand that if one screws down the screw 76 the conical head forces the diameter 64 to expand filling the hole 43.

OPERATION

Since our invention has greater utility whenever one has to set a reatively heavy jig accurately onto to a tool bed, the average person must handle the jig with the aid of a crane. Therefore one would with an appropreate sling (not shown) lift the jig 41 and position it above the the bed 10 somewhat as shown in FIG. 1. The dowels 61 are secured into their respective places, for example, by reaching under the jig and slipping a dowel into each hole until the upper larger diameter is fully engulfed within the hole 43, as shown in FIG. 3. With a screw driver one would reach into the hole 43 from the top of the jig and secure the dowel in place. Normally three dowels 61 are sufficient to ensure that the jig would not move in the direction parallel to the plane of the bed, but in some cases, one skilled in the art would discover that only two dowels would suffice.

After the dowels are locked in place, three keys 51 are positioned within the grooves 16 & 17 formed in the bed 10. One can readily approximate by sight the position of the keys so they would be somewhat aligned with a respective dowel. If the positions are way off, one can lower the jig closer to the bed, leaving a space sufficient to access the keys and slide them into a better position. With reatively little training one can preform the above because one of the features of our invention is that one dowel need not be precisely aligned with a hole in the key. The jig is now lowered and, since the lower diameter 62 of the dowel is quite smaller than the upper portion 58 of the bore in the key, the dowel will enter the key and the conical surfaces thereon automatically aline both axes. The jig is further lowered until surfaces 11 & 42 make contact.

We claim:

1. In combination, a dowel and a key adopted to be used to secure a jig onto a flat-surface bed of a machine tool wherein said jig has a flat surface and at least one accurately positioned bore having an opening at said flat surface and said bed having a plurality of longitudinal grooves disposed criss-crossing a plurality of transverse grooves formed in the flat surface thereon;

said dowel being symetrical about an axis and disposed removeably fixed and partially within said bore on said jig leaving a portion extending from said flat surface, and said portion extending from said flat surface having a smaller diameter at its exposed end than its diameter adjacent said jig; and said key being disposed within one of said grooves and having a pair of opposing sides spaced apart a sufficient distance so that said key is capable of sliding along said groove, and said key having a symetrical hole formed therein wherein the diameter of said hole adjacent said top surface is larger than the diameter of said hole extending into said groove;

said dowel includes means for fixing and removing said dowel to and from said bore, said means comprising:

said dowel having an axially aligned well and having a pair of axially aligned slots disposed on opposite sides thereof, and means dispsoed within said well for forcing said slots open while said dowel is disposed within said bore and fixing said dowel therein.

2. In combination, a dowel and a key adopted to be used to secure a jig to a bed wherein said jig has a first flat surface and at least three accurately positioned bores each having an opening at said first flat surface and said bed having a second flat surface and a plurality of longitudinal grooves disposed criss-crossing a plurality of transverse grooves formed in said second flat surface;

said dowel being symetrical about a first axis and capably of being disposed removeably fixed and partially within one of said bores leaving a portion extending from said first flat surface, and said portion extending from said first flat surface having a smaller diameter at its exposed end than its diameter adjacent said first flat surface and having a cylindrical surface disposed adjacent said first flat surface and a conical surface disposed adjacent to said cylindrical surface;

said key being capable of being slideably disposed within any one of said grooves and having having an exposed surface substantially flush with said second flat surface, and said key having a hole symetrical about a second axis and said hole in said key having a hollow cylindrical contour disposed adjacent said second flat surface;

said cylindrical surface and said hollow cylindrical contour each has a diameter so that when one is nested into the other, wherein said first and second axes coincide, a snug fit is formed therebetween and each has an axial length so that the length of said cylindrical surface is less than the length of said hollow cylindrical contour so that said first flat surface is in touching relationship with said second flat surface whenever said dowel is nested within said hole.

3. In the combination of claim 1 whereing said means disposed within said well comprises;
- female threads formed in the inner protion of said well,
- a hollow conical surface communicating with said female threads, and
- a screw having male threads matching said female threads and having a head with a tapered surface adjacent said male threads.

4. In the combination of claim 2, said dowel includes means for fixing and removing said dowels to and from said bore, said means comprises:
- said dowel having an axially aligned well and having a pair of axially aligned slots disposed on opposite sides thereof, and
- means disposed withing said well for forcing said slots to open while said dowel is disposed within said bore to fix said dowel therein.

5. In the combination of claim 4 whereing said means disposed within said well comprises;
- female threads formed in the inner protion of said well,
- a hollow conical surface communicating with said female threads, and
- a screw having male threads matching said female threads and having a head with a tapered surface adjacent said male threads.

* * * * *